Aug. 11, 1931.  H. W. NIEMAN  1,818,643
POWER TRANSMISSION MECHANISM
Filed March 22, 1930.  2 Sheets-Sheet 1
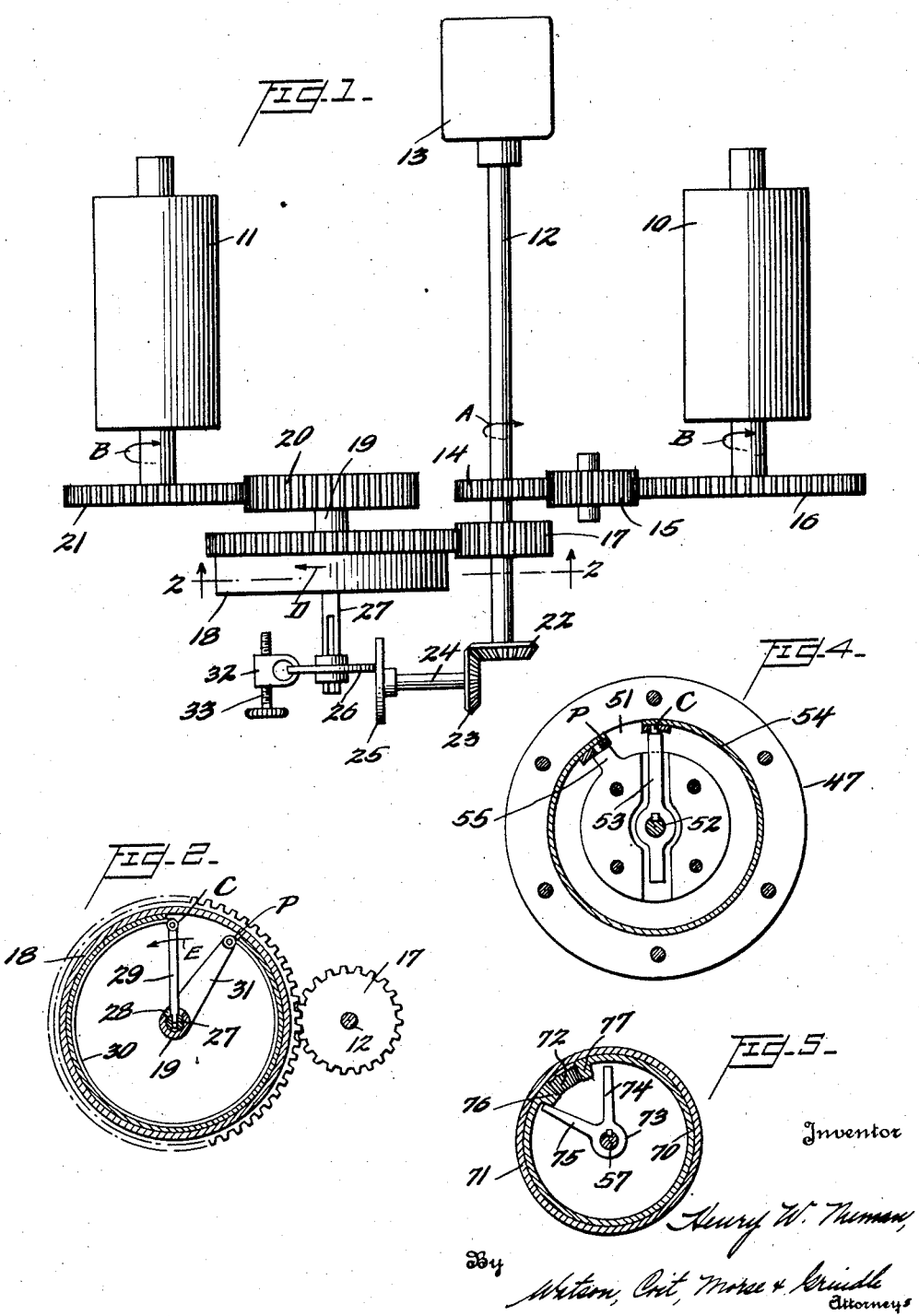

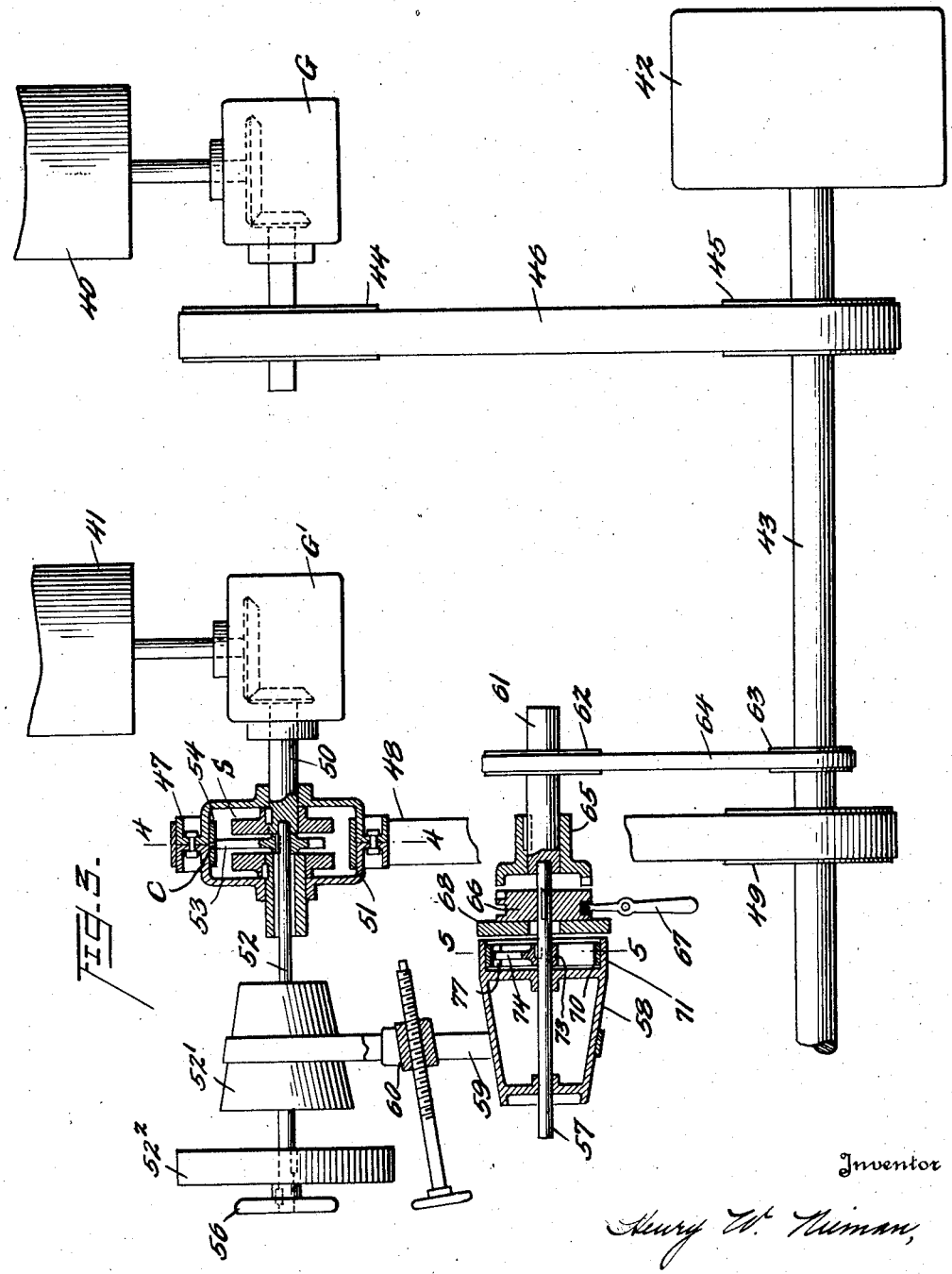

Patented Aug. 11, 1931

1,818,643

UNITED STATES PATENT OFFICE

HENRY W. NIEMAN, OF BETHLEHEM, PENNSYLVANIA, ASSIGNOR TO BETHLEHEM STEEL COMPANY, A CORPORATION OF PENNSYLVANIA

POWER TRANSMISSION MECHANISM

Application filed March 22, 1930. Serial No. 438,144.

This invention relates to mechanism for driving two or more rotatable shafts at variable relative speeds, and particularly to mechanism for rotating spaced rollers in a paper mill or the like at any desired relative peripheral speeds.

Numerous types of machines commonly employed in the industrial arts include rollers, arranged in sets or groups of two or more, together with means for driving the rollers by mechanical power, generally one or more electric motors or a line shaft, the successive groups of rollers being designed and adapted to act simultaneously upon a single article passing through the machine, such as a sheet or strip of paper or metal.

In many instances such machines have included means whereby the peripheral speeds of the several sets of rollers might be modified or adjusted relatively to one another, so that the operator might readily effect the necessary adjustment in the event that there was either a tendency toward "looping" of the strip between sets of adjacent rolls due to insufficient tension, or stretching of the strip due to excessive tension.

In accordance with the present invention, a novel type of driving mechanism for the sets of adjacent rolls is provided whereby such rolls may be conveniently driven from a single power source or, if desired, from different power sources, while, at the same time, by means of a novel mechanism interposed between the power source and one or both of the sets of rollers, the relative peripheral speeds thereof may be varied as desired. Means is also provided whereby the operator is enabled to stop the rotation of the set of rollers to which such mechanism is applied to effect "inching" or minor adjustment of the angular position of this set of rollers by power taken from a mechanical power source, but under the close control of the operator.

The invention is susceptible of very considerable modification in its application to various machines or instrumentalities of the mechanical arts, and in the accompanying drawings two embodiments thereof are illustrated by way of example.

In the drawings:

Figure 1 is a partial plan view of a rolling mill, showing two spaced rollers and the novel means for driving them at different relative speeds of rotation;

Figure 2 is a section on line 2—2 of Figure 1;

Figure 3 is a partial plan view of a rolling mill having a somewhat modified roller driving mechanism, portions of several of the elements thereof being broken away to show the interior details;

Figure 4 is a section on line 4—4 of Figure 3; and

Figure 5 is a section on line 5—5 of Figure 3.

In the embodiment of the invention illustrated in Figure 1, the spaced rollers are indicated at 10 and 11, respectively, being, in this instance, mounted to rotate about parallel axes and having substantially the same diameters. It will be understood that Figure 1 is largely diagrammatic and that associated with each roller will be a companion roller, or a number of companion rollers, between which and the rollers illustrated a sheet of paper, metal, or the like may be passed so as to be acted upon by, or pinched between, the cooperating rollers. A power shaft is indicated at 12 which may be caused to rotate at the desired speed by any suitable source of power, for instance, from the electric motor 13. A gear 14 fixed on shaft 12 meshes with an idler 15 which in turn meshes with a gear 16 rigidly connected to roller 10. Roller 10 is therefore at all times directly operated by the power motor. A second gear 17 on shaft 12 meshes with the teeth formed on the periphery of a drum 18 rotatably mounted on the work shaft 19 of a wrapping friction type of servo mechanism, such, for instance, as disclosed in my copending application Serial No. 79,956, filed January 8, 1926, of which the present application is a continuation in part. Rigid with the work shaft 19 is a gear 20 which meshes with a gear 21 rigidly connected to roll 11. Roll 11 is therefore driven by the power motor 13, but through the servo mechanism, instead of being driven directly as in the case of roll 10.

A third gear 22 of beveled type is fixed on the end of shaft 12, and this gear meshes with a second beveled gear 23 rigidly supported on the end of a short shaft 24 mounted to rotate about a fixed axis. On the opposite end of shaft 24 is fixed a disk 25, preferably faced with friction material. Against this last mentioned disk a friction wheel 26 is adapted to bear, this friction wheel being mounted upon the control element 27 of the servo mechanism.

As can be seen from an inspection of Figure 2, the control element 27 is co-axial with the work shaft 19 and extends within the same, being capable of slight rotatory movement relative thereto. At a point within drum 18 the work arm 19 is slotted as at 28, and a radially extending member, indicated at 29 and hereinafter designated the control arm, extends through this slot and has its inner end rigidly secured to the control element. The outer end of the control arm 29 carries the control end C of a flexible friction band 30 which is adapted to normally have light frictional contact with the cylindrical inner friction face of drum 18 and is adapted to be brought into operative engagement with this cylindrical friction face upon movement of the control arm 29 in the direction of the arrow E, the cylindrical drum 18 being driven by the operating mechanism in the same direction. The power delivery end P of band 30 is connected to the outer end of a radially extending arm 31, hereinafter designated the work arm, the inner end of which arm is rigidly secured to the work shaft 19.

The friction wheel 26 is splined to the control element 27 so that it may be moved axially along the control element by means of an adjusting device having a portion 32 with arms which extend to opposite sides of the disk and nearly touch the same, and a manually rotatable threaded rod 33 for moving this member in a direction parallel to the axis of the control element 27.

Rotation of the power shaft 12 in the direction of the arrow A results in rotation of the rolls 10 and 11 in the direction of arrows B, B, the roll 10 being directly operated and the roll 11 being operated through the servo mechanism, as before pointed out. The friction drum 18 is constantly rotated by gear 17 in the direction of arrow D. The control element 27, however, is also rotated in the same direction by the friction wheel 26 so that the control end C of the friction band is caused to engage the inner surface of the drum, and the band therefore takes power from the drum, which power is transmitted to the work member or shaft 19 through the radial arm 31. The speed of rotation of roll 11 is proportional to the speed of rotation of the control element 27 at all times. By moving the friction wheel 26 in a direction away from the axis of rotation of the friction disk 25, the speed of rotation of the control element may be increased, and hence the speed of rotation of roll 11 increased, and, by moving the friction wheel 26 toward the axis of rotation of disk 25, the speed of rotation of the control element may be decreased, and hence the speed of rotation of drum 11 decreased. By making suitable adjustments of the nut 32, the roller 11 may be caused to revolve at any angular speed desired, within the limits of the mechanism, and hence the rollers 10 and 11 caused to have any desired relative peripheral speeds.

In the embodiment of the invention disclosed in Figures 3, 4, and 5, the rollers are indicated at 40 and 41, respectively, and the source of power which may conveniently be an electric motor, at 42. A line shaft is indicated at 43, which shaft may be of any desired length so as to furnish power for any number of rollers, depending upon the length of the mill and the number of rollers employed. Roller 40 is directly driven from the line shaft 43 through the beveled gearing, indicated generally at G, pulleys 44 and 45, and belt 46.

Rollers 41 is not driven directly from the line shaft but is connected to the line shaft through a beveled gearing G', pulley 47, belt 48, pulley 49, and also through a servo mechanism indicated generally at S, which, for the sake of convenience and compactness, is disposed within the pulley 47.

This servo mechanism is of simple type comprising essentially a work shaft 50 connected to one of the beveled gears of gearing G', a drum 51 integral with pulley 47 and driven therewith, which drum is revolubly mounted upon the work shaft, a control element 52 concentric with the work shaft and rotatably mounted within an axial recess formed therein, together with a control arm 53, the inner end of which is fixed on the control element and the outer end of which is connected to the control end C of a flexible friction band 54, and a work arm 55 rigid with the work shaft 50 and to which the power end P of the friction band is suitably secured.

Fixed upon control element 52 is a cone 52', a fly-wheel $52^2$, and a hand-wheel 56. Spaced from and arranged parallel to control element 52 is a shaft 57 having rotatably mounted thereon a cone 58, reversed with respect to cone 52', and a suitable belt 59 is arranged to tightly engage and operatively connect both cones so that they rotate simultaneously. A belt shifting device is indicated generally at 60 and by means of which the belt may be moved in a direction parallel to the axes of control element 52 and shaft 57 so that control element 52 may be variably driven from shaft 57.

Aligned with shaft 57 is a short shaft 61 connected by means of pulleys 62, 63, and belt 64 with the line shaft 43. Upon the inner end of shaft 61 is keyed or otherwise fixed the stationary portion 65 of a toothed clutch. The movable element 66 of this clutch is splined upon the shaft 57, and an operating lever 67 of any suitable character is provided for moving member 66 into or out of operative engagement with portion 65 of the clutch to the end that the shaft 57 may be operatively connected to, or disconnected from, shaft 61 and the line shaft 43. A stationary disk-like member, which may conveniently form a portion of the frame of the mill, is indicated at 68, and in the operation of the device, which will be hereinafter more fully explained, clutch member 66 may be caused to contact with stationary member 68 so that a considerable frictional retardation of member 66 and shaft 57 may be brought about by a sort of braking action.

Cone 58 is driven from shaft 57 through the intermediary of a friction clutch, shown in section in Figure 5. This clutch comprises essentially a friction band 70 which is urged into frictional contact with the cylindrical inner surface of the extension 71 of cone 58 by means of a coiled compression spring 72 interposed between the ends of the band. Fixed on shaft 57 is a collar 73 having spaced radially extending arms 74 and 75, respectively, the outer ends of which terminate just short of the friction band but are so positioned that arm 75 may strike a lug 76 projecting inwardly from one end of the band upon the occurrence of relative movement of the band and shaft 57 in one direction, or the outer end of arm 74 may strike lug 77 projecting inwardly from the opposite end of the band, upon the occurrence of relative movement of the band and shaft 57 in the opposite direction. The control element therefore is connected to the line shaft 43 through the speed regulating mechanism comprising cones 54, 58, and belt 59, the friction clutch including drum 71 and band 70, and the positive clutch comprising members 65 and 66. The roller 41 is connected to shaft 43 through the agency of the servo mechanism S which is in turn under the control of the control element 52. In the operation of the mechanism the line shaft 43 will normally be in constant rotation, and the roller 40 will always be driven at a speed proportional to the speed of rotation of the line shaft. The roller 41 may, however, be driven at any desired speed less than that of pulley 47 or may be stopped entirely without stopping the line shaft.

Assuming the line shaft 43 to be stationary and the power initially applied, it will be seen that the pulley 47 will immediately begin to rotate, and likewise the shaft 61. Even assuming clutch member 66 to be positively engaged with member 65, however, it will be apparent that the control element 52 will not immediately rotate at the speed which it subsequently acquires because of the action of the friction clutch comprising band 70, a drum 71, and the fly-wheel $52^2$. Fly-wheel $52^2$ opposes by its inertia acceleration of shaft 52, and hence there is a very considerable period of slip between band 70 and drum 71 before the inertia of fly-wheel 55 is overcome. As a result, control element 52 only gradually picks up speed, and control arm 53 only gradually accelerates its angular velocity so that the friction band 54 gradually increases the intensity of its contact with rotating drum 51 and takes more and more power therefrom for the operation of roller 41. The net result of this arrangement insures a gradual starting of roller 41, but this period of gradual starting may be varied in length by modifying the action of spring 72, that is, by making this spring of greater or less strength. It will be appreciated that the work shaft 50 is, in the normal operation of the mill, caused to rotate at the speed of the control element 52. If control element 52 rotates at a speed less than that of drum 51, there is constant slip between the band 54 and drum 51, and, when the rotation of the control element is completely stopped, as by disengagement of clutch members 65 and 66, the band 54 takes substantially no power from drum 51, and the rotation of roll 41 likewise ceases.

It is sometimes desired to stop roll 41, and any companion rolls which may be driven therefrom, and to rotate it slowly under manual control to effect an adjustment therein. Ordinarily the rolls are too heavy to be manually moved, but by means of the above described mechanism its angular adjustment can be very easily effected without the exertion of any appreciable manual effort. Thus, the clutch members 65, 66 may be disengaged, causing roll 41 to cease rotation. Hand-wheel 56 may then be operated, however, to cause partial rotation of control element 52. Inasmuch as drum 51 is still rapidly rotating, power is taken from this drum by band 54, upon the actuation of the control element, and the work shaft 50, and hence the roll 41 is moved through an angle exactly proportional to the angle of rotation of the control element 52, but the power required for this rotation is taken from the drum 51. By the mechanism disclosed, therefore, the roll may be adjusted under manual control but with the expenditure of very little manual power, regardless of how heavy it may be.

In the event that it is desired to effect simultaneous stoppage of rolls 40 and 41, followed by adjustment of roll 41 relatively to roll 40, I provide a clutch located at any convenient point in the power connection between line shaft 43 and roller 40 so that this roller (and its associated rollers) may be completely disconnected from the line shaft while the position of roller 41 and its associated rollers is adjusted under manual control.

In the two embodiments of the invention which have been selected for disclosure by way of example, the two sets of rolls illustrated are shown as being driven from a common power shaft. This is the normal and preferred arrangement, but in its broad sense the invention is in nowise limited with respect to the source of power employed for driving the rollers, it being quite possible to utilize an independent source of mechanical power for each set of rollers where, for any reason, such an arrangement should be preferred. Thus, each set of rollers may be driven by an individual electric motor, or the power for rotating certain of the rollers may be taken from a line shaft and the power for rotating one or more of the individual groups taken from an entirely different source, such as an independent electric motor. For instance, in the form of the invention illustrated in Figure 3, the pulley 47 may be driven from a different shaft or from an individual electric motor rather than from the line shaft 43 by means of the belt and pulley shown. Regardless of the exact source of mechanical power for actually driving the rollers, however, it is necessary to have a common line shaft, or its equivalent, from which the control element of the servo mechanism, or servo mechanisms if there are more than one, may be driven.

Any number of sets of rollers may be employed, as has been heretofore pointed out, and it is also desirable, under some circumstances, to employ an individual servo mechanism and speed controlling drive for the control element thereof, in association with each set of rollers. In such an assembly individual power sources for the several sets may be conveniently employed and the close regulation of the relative speeds of rotation of the several sets of rollers conveniently brought about by causing the control elements of the several servo mechanisms to be rotated at the proper speeds relatively to one another. The power for rotating the several control elements of this form of mechanism should be taken from a common means, for instance, from a line shaft which lies adjacent the ends of all of the sets of rollers. If this is done, it is easily possible to effect the most delicate adjustment of the peripheral speed of one set of rollers relatively to the peripheral speed of any other set, and, all of the servo-mechanism control elements being driven by a common means, all sets of rollers will be accelerated or decelerated in unison when the machine is started or stopped.

The invention may be advantageously used wherever any two members are to be driven at speeds which are to be relatively adjusted from time to time. While it is of particular utility in connection with paper mills, it is obviously applicable to many other types of industrial machines, and its use is in nowise confined to the specific embodiments disclosed in the accompanying drawings by way of example.

Having thus described the invention, what is claimed as new and desired to be secured by Letters Patent is:

1. Mechanism of the class described, including, in combination, a power shaft, two driven shafts, a direct driving connection between the power shaft and one of the driven shafts, means connecting the power shaft and the other driven shaft including a drum connected to the power shaft to be driven thereby, a work shaft, a control element, a friction band connecting the control element and work shaft and contacting with the drum, and means connecting the power shaft and control element including a speed control device whereby the relative speeds of the power shaft and control element may be varied at the will of the operator.

2. Mechanism of the class described, including, in combination, a power shaft, two driven shafts, a direct driving connection between the power shaft and one of the driven shafts, means connecting the power shaft and the other driven shaft including a drum connected to the power shaft to be driven thereby, a work shaft, a control element, a friction band connecting the control element and work shaft and contacting with the drum, and means connecting the power shaft and control element including a positive clutch by means of which this connection may be broken, and a control device whereby the relative speeds of the power shaft and control element may be varied at the will of the operator.

3. Mechanism of the class described, including, in combination, a power shaft, two driven shafts, a direct driving connection between the power shaft and one of the driven shafts, means connecting the power shaft and the other driven shaft including a drum connected to the power shaft to be driven thereby, a work shaft, a control element, a friction band connecting the control element and work shaft and contacting with the drum, and means connecting the power shaft and control element including a clutch whereby the connection may be broken, and a device for retarding the angular speed of rotation of the control element after disconnection of the clutch elements.

4. Mechanism of the class described, including, in combination, a power shaft, two driven shafts, a direct driving connection between the power shaft and one of the driven shafts, means connecting the power shaft and the other driven shaft including a drum connected to the power shaft to be driven thereby, a work shaft, a control element, a friction band connecting the control element and work shaft and contacting with the drum, and means connecting the power shaft and control element including a flywheel connected to the control element, and an automatically operating friction clutch interposed between the drive shaft and control element, whereby the control element is slowly accelerated or decelerated.

5. Mechanism of the class described, including, in combination, a power shaft, two driven shafts, a direct driving connection between the power shaft and one of the driven shafts, means connecting the power shaft and the other driven shaft including a drum connected to the power shaft to be driven thereby, a work shaft, a control element, a friction band connecting the control element and work shaft and contacting with the drum, and means connecting the power shaft and control element including a flywheel connected to the control element and drive shaft, and an automatically operating friction clutch between the positive clutch and control element.

6. Mechanism of the class described, including, in combination, a power shaft, two driven shafts, a direct driving connection between the power shaft and one of the driven shafts, means connecting the power shaft and the other driven shaft including a drum connected to the power shaft to be driven thereby, a work shaft, a control element, a friction band connecting the control element and work shaft and contacting with the drum, and means connecting the power shaft and control element including a fly-wheel connected to the control element, a positive clutch between the control element and drive shaft, an automatically operating friction clutch between the positive clutch and the control element, and a braking device for slowing the motion of the control element after disconnection of the positive clutch, a portion of the movable element of the positive clutch forming one element of the braking device and a stationary member the second element.

7. Mechanism of the class described, including, in combination, two driven shafts, means for connecting one of said shafts to a power source, a power driven drum, a work shaft operatively connected to the second driven shaft, a control element, a friction band connecting the work member and control element and contacting with the drum, and a connection between the control element and first driven shaft.

8. Mechanism of the class described, including, in combination, two or more shafts to be simultaneously driven, means for driving one of the shafts, and means for driving the other shaft comprising a power driven drum, a work member, a control element, a friction band connecting the work member and control element and contacting the drum, and a connection between the first driven shaft and control element, including a device for regulating the speed of the control element relatively to the first driven shaft.

9. Mechanism of the class described, including, in combination, a shaft to be driven at various angular speeds, a power driven drum, a friction band to take power from the drum, means connecting the power delivery end of the band and the shaft, a control element for adjusting the control end of the band, a second shaft normally driven at uniform speed, and means operatively connecting the second shaft and control element whereby the control element may be driven at various speeds relative to the speed of the second shaft.

10. Mechanism of the class described, including, in combination, two or more shafts to be simultaneously driven, means for driving one of the shafts, and means for driving the other shaft comprising a power driven drum, a work member, a control element, a friction band connecting the work member and control element and contacting the drum, and a connection between the first driven shaft and control element, including a flywheel connected to the control element, and friction clutch interposed between the driven shaft and control element, whereby the control element is slowly accelerated or decelerated.

In testimony whereof I hereunto affix my signature.

HENRY W. NIEMAN.